United States Patent [19]
Weber

[11] 4,033,380
[45] July 5, 1977

[54] THREAD PROTECTOR
[76] Inventor: Richard C. Weber, 2589 Sears Road, Stow, Ohio 44224
[22] Filed: Aug. 27, 1975
[21] Appl. No.: 608,036

Related U.S. Application Data
[63] Continuation of Ser. No. 539,366, Jan. 8, 1975, abandoned, which is a continuation of Ser. No. 348,061, April 5, 1973, abandoned.

[52] U.S. Cl. .................................. 138/96 T
[51] Int. Cl.² ............................. B65D 59/08
[58] Field of Search ......... 138/96 R, 96 T, 109; 151/7, 11, 21 R, 21 B, 21 C; 215/37 R, 38 R, 73; 220/24 R, 42 A, 60 R; D9/254, 258, 260, 285; 16/2, 108; D23/41

[56] References Cited
UNITED STATES PATENTS

| | | | |
|---|---|---|---|
| 1,489,785 | 2/1922 | Porter | 138/96 R |
| 1,674,998 | 6/1928 | Spang | 138/96 R |
| 2,279,388 | 4/1942 | Cox | 151/21 B X |
| 2,580,762 | 1/1952 | Grenier et al. | 220/42 |
| 2,709,469 | 5/1955 | Tripp et al. | 151/21 B |
| 2,796,107 | 6/1957 | Schwaiger | 151/21 B |
| 2,873,765 | 2/1959 | Gregory | 138/96 R |
| 2,930,409 | 3/1960 | Higgins | 138/96 T |
| 3,065,767 | 11/1962 | Topf | 138/96 R X |
| 3,238,987 | 3/1966 | McCartney et al. | 151/21 B |
| 3,277,942 | 10/1966 | Dwyer | 151/21 B |
| 3,496,800 | 2/1970 | Brezinski | 151/21 B X |
| 3,574,312 | 4/1971 | Miller | 138/96 R |
| 3,729,757 | 5/1973 | Wright | 151/21 B X |
| 3,840,052 | 10/1974 | Schmidt | 138/96 T |
| D. 201,401 | 6/1965 | Picot | D58/26 |
| D. 204,514 | 4/1966 | Berman | D58/26 |

FOREIGN PATENTS OR APPLICATIONS 376,004 7/1932 United Kingdom ............ 138/96 T Primary Examiner—Richard E. Aegerter
Assistant Examiner—James E. Bryant, III
Attorney, Agent, or Firm—Fay & Sharpe

[57] ABSTRACT

A thread protecting device particularly adaptable for use in protecting pipe threads and the threads on various machine parts to prevent them from being damaged during shipping and handling. The protector itself comprises a generally cup-shaped body having a continuous side wall which tapers outwardly for at least a portion of its axial length from a closed bottom end wall toward an open upper end. The side wall has a generally polygonal cross section adjacent the bottom end wall which gradually converges into a generally circular cross section adjacent the open upper end. The thread protector itself is preferably molded from plastic material.

12 Claims, 6 Drawing Figures

THREAD PROTECTOR

This application is a continuation of application Ser. No. 539,366, filed Jan. 8, 1975, and now abandoned, which was a continuaton of application Ser. No. 348,061, filed Apr. 5, 1973 and now abandoned.

BACKGROUND OF THE INVENTION

This invention pertains to the art of protective devices and more particularly to a thread protecting device.

The invention is particularly applicable to use with conventional pipe or tube fittings and machine parts having pipe threads thereon and will be described with particular reference thereto; however, it will be appreciated to those skilled in the art that the invention could be readily adapted for use in other environments for example, where similar protective devices are employed to protect other types of fragile or destructible threaded areas.

Conventional pipe threads and pipe fitting threads are, of course, generally V-shaped in cross section. Because of the handling techniques generally employed with such items, the threads are often "bounced" around or otherwise mistreated during manufacture, shipment and use. Such mistreatment can cause particular damage to the crests of the threads by way of nicks, indentations and deformation resulting in their being unusable. Various forms and types of thread protecting devices have heretofore been suggested and employed in the industry, all with varying degrees of success. It has been found that the defects present in most prior thread protecting devices are such that the devices themselves are of limited economic value.

Typically, these prior thread protectors have variously comprised cup-shaped members formed from relatively heavy rubber, plastic, paper or the like. Generally, the internal diameters of at least a portion of these protectors have been slightly smaller than the outer diameter of the pipe or fitting threads. This dimensional arrangement facilitated resiliently gripping of the threads so that the protecting devices could not be easily dislodged during shipping handling. Oftentimes, beads, thread forms and the like were formed inside the protective devices to enhance the overall gripping power.

Problems inherent in such prior art protectors included, among others, unacceptable results due to tolerance variations in both the threads and the protectors. For example, the protectors generally had to be constructed so that they could properly be held in place with the widest set of tolerance variations possible, i.e., maximum thread undersize dimension and maximum protector oversize dimension. Consequently, when the opposite tolerance variation situation was present, i.e., maximum thread oversize and maximum protector undersize, the protectors were extremely difficult to properly place over the threads and often, extremely difficult to remove when so desired. The difficulty thus encountered resulted in an increase in the overall unit cost and customer dissatisfaction. Further, unless the protectors were made from highly resilient material, undesired splitting of the protectors was a frequent occurrence. This "resiliency" requirement should not be confused with "elasticity" inasmuch as a protector must have some rigidity to function adequately by allowing the open end thereof to be telescoped over the threads without some preliminary expansion step being involved.

Other problems have also been present in prior protectors where it was desired to make the protectors tight fitting enough to prevent accidental removal. In prior plastic constructions the cup-shaped plastic protectors become locked on the threads due to plastic deformation of the protectors which was then followed by a setting of the plastic in that deformed shape. That is, prior, conventional plastic shell arrangements tended to tightly circumferentially grip the thread crest so that over a period of time, the relatively thick walls took a permanent set by virtue of a small amount of plastic flow which formed crests and valleys within the cup interior. When it was subsequently desired to remove the protectors from the threads by applying an axial force thereagainst, it was found that removal could not always be effected by hand. It was essentially required, therefore, to unthread the protectors from the protecting condition which, also, oftentimes required a substantial amount of force and effort. In these instances a customer has been faced with incurring a small additional labor cost due to the extra time required in such unthreading type removals and, at times, it has been necessary to cut the protectors away from the threads which resulted in even more time being consumed.

Although the relative time involved in the difficult removal situations is not considered to be particularly substantial when taken on a piecemeal basis, it will be appreciated that when protectors of these prior types are disposed on, for example, tube fittings which are then to be attached to equipment moving along an assembly line at a constant set speed, the need for uniform motions to strip the protectors and affix the fittings are extremely important to an overall smooth and efficient production operation. Variations in the removal process are both time consuming and irritating to workers. The time consuming aspect adds undesirable costs which are ultimately either absorbed by the manufacturer which reduces his profits or passed along to the consumer which places the manufacturer in a less competitive position.

Still another problem with the prior protectors was that they had to be made with relatively heavy walls. This result was due to the method by which they were made, i.e., injection molding, and the necessity for having substantial resiliency. This need only added further cost to these prior protectors.

BRIEF DESCRIPTION OF THE INVENTION

The present invention contemplates a new device which overcomes all the above referred to problems and others and provides a new thread protector which is simple, economical to manufacture, readily adaptable to a plurality of uses with threaded members having a variety of dimensional characteristics, easy to install and easy to remove.

In accordance with the present invention, there is provided a thread protector particularly suited for protecting standard tapered pipe threads and pipe fitting threads. The new protector comprises a generally cup-shaped body having a bottom end wall, a continuous side wall and an open upper end. The side wall tapers outwardly at least over a portion of the axial length from the closed bottom end toward the open upper end. The protector is of a generally polygonal cross section adjacent the bottom end and merges into a generally circular cross section adjacent the upper end.

In accordance with another aspect of the present invention, the cross sectional dimension of the cup-shaped protector increases from a minimum dimension which is slightly less than minimum diameter of the tapered pipe threads to a dimension greater than the maximum diameter of the tapered pipe threads and the pipe or tube itself. The axial length is slightly greater than the axial length of the threaded portion which is to be covered and protected.

In accordance with still another aspect of the present invention, the protector engages only a portion of the outermost threaded area while extending over the full axial length thereof.

In accordance with still a further aspect of the present invention, the protector includes an inwardly extending circumferential bead adjacent the open end to engage an inner, axially spaced thread.

In accordance with yet a further aspect of the present invention, the particular protector configuration provided facilitates desirable expansion conditions whereby undesired splitting of the protector can be eliminated.

The principal object of the present invention is the provision of an efficient and versatile pipe thread protector.

Another object of the present invention is the provision of a pipe thread protector which is simple and economical to manufacture.

Another object of the present invention is the provision of a thread protector which is readily adaptable for use with pipe thread arrangements having a plurality of tolerance variations.

Still another object of the present invention is the provision of a thread protector which is easy to remove from its close fitting protective relationship with pipe threads.

Still a further object of the present invention is the provision of a thread protector which substantially reduces the problems of protector splitting during use.

Yet a further object of the present invention is the provision of a thread protector which overcomes nesting problems normally inherent in the storage of prior types of thread protectors.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DESCRIPTION OF THE PREFERRED EMBODIMENT

Figure 1:
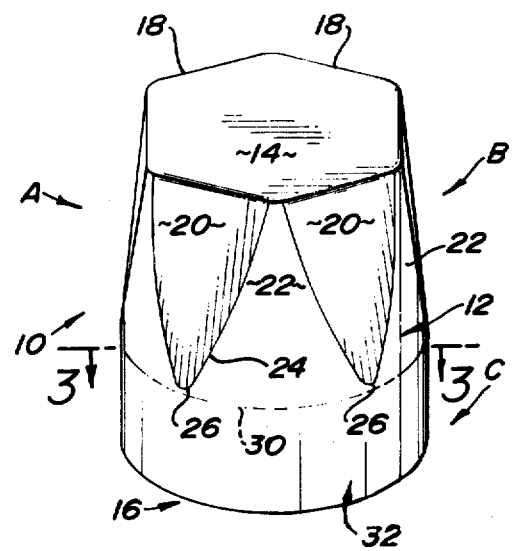
FIG. 1 is a perspective view of a thread protector formed in accordance with the present invention.
Figure 2:
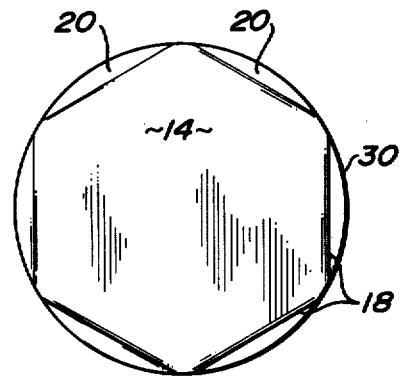
FIG. 2 is a plan view of the thread protector shown in FIG. 1.

Referring now to the drawings wherein the showings are for purposes of illustrating the preferred embodiment of the invention only and not for purposes of limiting same, the Figures show a thread protector A comprised of a closed bottom end area B and an open top end area C.

More specifically, thread protector A comprises a generally cup-shaped member 10 having a continuous side wall 12, a bottom wall 14 and an open upper or top end 16. Closed bottom end area B has a generally polygonal cross section and, in the preferred embodiment, bottom end wall 14 is substantially hexagonal having interconnected side edges 18. The particular configuration of end area B is deemed to be frusto polygonal and will be referred to as such hereinafter. Extending along continuous side wall 12 from such side edge 18 of bottom wall 14 is a side panel 20, each having a substantially planar configuration. Disposed between each side panel 20 is a generally arcuately shaped transition zone 22 and the side panels and transition zones are joined or connected to each other by a plurality of corner edges 24 extending generally axially along a portion of continuous side wall 12. As will be seen from the Figures, each corner of hexagonal bottom wall 14 includes a pair of these corner edges diverging from each other along the side wall from a close spaced relationship at bottom wall 14. The adjacent corner edges 24 of adjacent corners of the bottom wall which converge toward each other come together or are joined at ends 26 spaced axially along the side wall toward open end 16 and define sides 20 therebetween. Corner edges 24 at each corner of the bottom wall are identical so that ends 26 are all disposed the same axial distance along side wall 12 from bottom wall 14. Transition zones 22 are thus defined between the two diverging corner edges of each corner of bottom wall 14 and, again, whereas side panels 20 are generally planar, transition zones 22 are generally arcuate or curvilinear.

Figure 6:
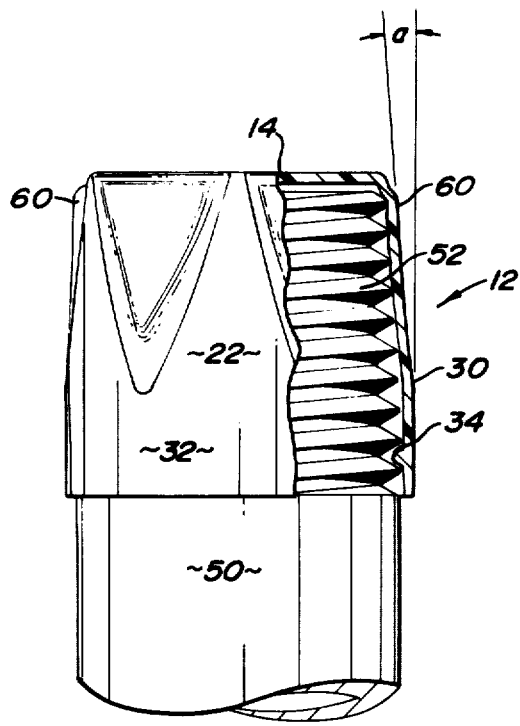

Closed bottom end area B and open upper or top end area C are, themselves, joined together at a merger zone 30 which is particularly shown in phantom in FIG. 1 and is readily apparent in FIG. 6. According to the preferred embodiment of the present invention, this merger zone is axially disposed along continuous side wall 12 immediately adjacent ends 26. Open upper or top end area C has a generally circular cross section and comprises a generally cylindrical area as shown by numeral 32. Formed integral with the inner peripheral surface of top end area C is a thread engaging means or bead 34. Although this thread engaging means preferably comprises an inwardly extending circumferential bead 34 disposed between merger zone 30 and open upper end 16, it will be appreciated that other arrangements could be employed without departing from the scope and intent of the present invention. The provision of the bead 34 is to further enhance the gripping ability of the protector when placed over a threaded member as will be described in detail hereinafter. Of course a plurality of axially spaced beads could be employed if so desired although it has been found that one such bead is entirely satisfactory for normal protector use. It will be readily appreciated by referring to all the drawings, side panels 20 of continuous side wall 12 taper outwardly from the smallest cross sectional dimension at bottom wall 14 to the greatest cross sectional dimension at merger zone 30. The reasons for the particular tapering configuration will be more fully developed hereinafter.

Figure 3:
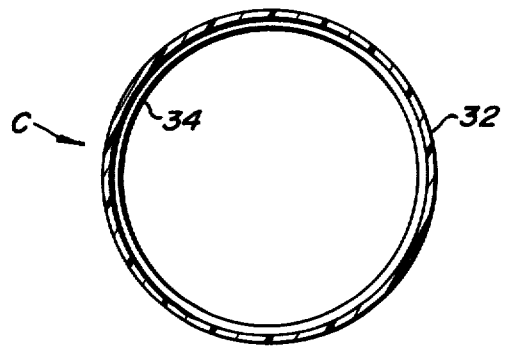
FIG. 3 is a cross sectional view taken along line 3—3 in FIG. 1.
Figure 5:
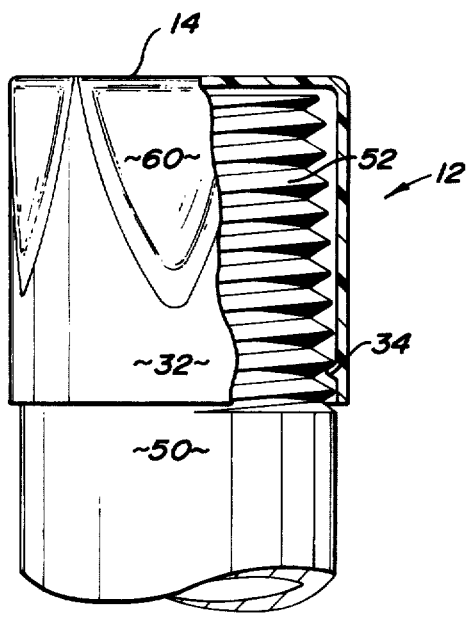
FIG. 5 is a broken side elevational view of the protector when positioned on a threaded element particularly showing the configuration of one portion of the protector side wall and its nonengagement with the threads; and, FIG. 6 is a broken side elevational view of the protector when it is positioned on a threaded element particularly showing the configuration of another portion of the protector side wall and its engagement with the threads.

Inasmuch as closed bottom end area B is frusto polygonal comprised of a plurality of planar side walls and arcuate transition zones, it will be appreciated that the degree or amount of taper for continuous side wall 12 will vary. According to the preferred embodiment of the invention, the taper of the transition zones when measured axially therealong from the corners of bottom end wall 13 is less than the amount or degree of the side panels when measured axially therealong. Specifically, FIG. 5 shows a partial cross sectional view of the thread protector when taken from one of the corners of the hexagonal bottom wall 14 through a transition zone 22 and FIG. 6 shows a partial cross sectional view through one of side panels 20 at the midpoint of the associated edge 18 showing taper angle $a$ of that side panel. By comparing FIGS. 5 and 6, it will be seen that but for the hexagonal configuration of bottom wall 14 and the taper of the side panels, the protector would comprise an elongated cylindrical member having a closed end. It will also be noted from FIG. 6 that the taper of the continuous side wall, i.e., sides 20 ends at merger zone 30 in order that the overall geometric configuration of open upper or top end area C may take a smooth cylindrical configuration (FIG. 3). Taper angle $a$ is greater than the taper of the threads which the protector is to protect. It will be appreciated that the specific arrangement shown and described hereinabove with reference to FIGS. 5 and 6 applies to all sides 20 and the corners of hexagonal bottom end wall 14.

Figure 4:
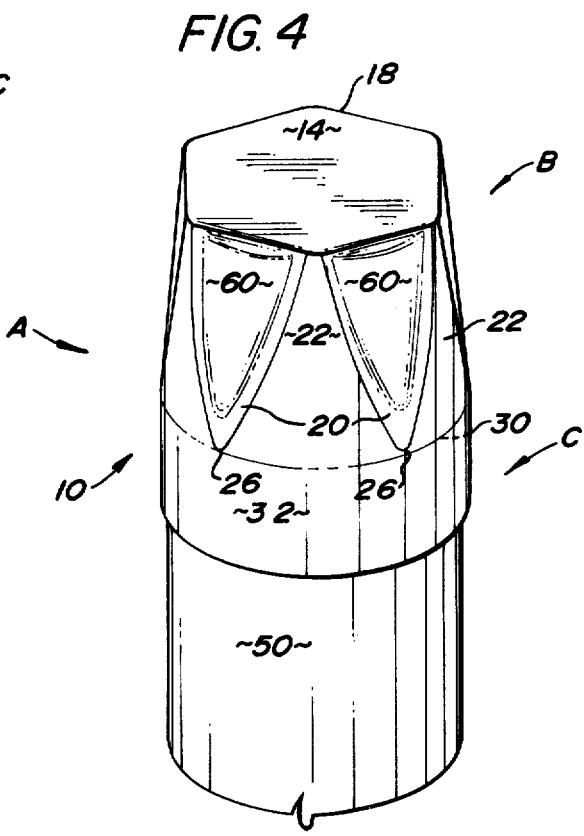
FIG. 4 is a perspective view of the thread protector showing it in position on a threaded element.

Referring to FIGS. 4, 5 and 6, description will now be made with reference to use of the subject thread protector with a conventional pipe 50 having conventional pipe threads 52 disposed at one end thereof. It should be appreciated that the protector is also intended for use with pipe and tube fittings of all types having conventional pipe threads thereon. It is, of course, known that conventional pipe threads normally taper outwardly at an angle of 1°47' from the outermost end toward the innermost end thereof. The protector is thus dimensioned so that the pipe threads are freely receivable in open end 16 as shown in the Figures. The smallest cross sectional dimension of bottom end wall 14, i.e., across the bottom wall between opposite side edges, is slightly smaller than the diameter of the outermost end of threads 52 when the threads have their minimum diameter under normally accepted tolerance variations. In any event, thread protector A is inserted over threads 52 until the outermost end of the threads is closely received within the protector adjacent bottom end wall 14. With this invention, the threads create an outwardly protruding bulge 60 in each side panel 20 as the side panels are engaged. Bulges 60 take the same general configuration as the side panels and effectively act to retain the thread protector in position on the threads.

As best seen from a comparison of FIGS. 5 and 6, the inner periphery of continuous side wall 12 only engages a portion of threads 52 axially therealong. That is, because of the particular geometric configuration employed in the thread protector, particularly at closed bottom end area B, only that area of side wall 12 which comprises side panels 20 actually closely engage any of threads 52 on threaded element of pipe 50. This relationship primarily occurs because the thread protector is dimensioned so that hexagonal bottom ends 14 substantially circumscribes the outermost end of threads 52 so that the portions of side wall 12 which extend axially along the protector at and adjacent the corners of the hexagonal bottom wall can never engage the threads themselves. Further, and because side panels 20 taper outwardly at an angle greater than the normal taper of the threads themselves, only the first two to five of the outermost axially spaced threads will effectively engage the side panels. Thus, in actuality, the subject new thread protector is maintained in a desired protecting position over a threaded element by means of the engagement of the outermost two to five threads with panels 20 of protector side wall 12. This arrangement is clearly indicated with reference to FIG. 5 showing the nonengagement of transition areas 22 and with reference to FIG. 6 showing the slight engagement of a typical side panel 20 by the outermost axially spaced threads 52. The axial length of protector A is such to at least cover all of threads 52 for protective purposes although in some instances, it may be deemed advantageous that it be slightly longer and extend over a portion of pipe 50 immediately adjacent the threads. Bead 34 acts to engage one of the innermost of threads 52 to further assist in retaining the protector in position. Because of the increasing diameter of threads 52 at the area thereof which is engaged by bead 34 and because the area of the protector at which the bead is located is a constant diameter, it is not necessary that bead 34 extend inwardly into the protector any substantial amount in order to effect a good retaining action.

Referring now to specific dimensional characteristics contemplated for a protector formed in accordance with the present invention as described above, a protector designed for use with standard pipe having standard pipe threads thereon will be considered. As is known, standard pipe threads taper at approximately 1°47' over the length thereof. In the preferred arrangement, it has been found that a taper angle $a$ of 5° is particularly advantageous in accomplishing best results. The fact that an air space or clearance area is formed around the threaded area between the threads and inner walls of the protector is particularly advantageous inasmuch as an air cushion is developed which partially absorbs side blows to the threaded area. Of course other taper angles could be employed without departing from the scope and intent of the present invention.

The particular design of the thread protector provides excess area at the closed bottom end so as to facilitate a desired expansion at that end during installation. This feature allows greater radial expansion than deemed possible or permissible at that end with the prior art, normally cylindrical straight sided protectors. Although only considered to be a small aspect of the present invention, this particular feature reduces the possibility of splitting of the protector when it is installed upon a pipe thread. This problem has heretofore particularly arisen when the protector was at its minimum allowable cross sectional diameter and the pipe threads are at their maximum allowable diameter for a particular pipe thread size or when the protector was forced onto the threads a greater degree than necessary under the circumstances.

Another desirable feature which is realized when using the protector of the subject invention as hereinabove described is the elimination of nesting problems. Such problems have occurred with prior protectors when shipping a plurality of them from one location to another since they were formed in a manner whereby they could easily be received one within another. Usually they were closely received in such a condition and, therefore, were extremely difficult to separate. The difficulty encountered in separation, although, again, not creating a significant difficulty on an individual basis, quite often caused substantial problems in production line processing.

When nesting has occurred in prior protectors, it has been the practice to squeeze or otherwise deform the nesting protector in order to remove it from a nested condition. However, when relatively rigid plastics were used in order to take advantage of their desirable manufacturing and cost characteristics, such squeezing or deformation had a tendency to cause splitting along any sharp corners. Due to the particular structural configuration of the subject protector, however, two protectors cannot be closely and completely received one within the other to thus eliminate the entire problem.

In accordance with the present invention, the protector may be conveniently conventionally molded or otherwise formed from a polyethelyne or similar plastic material. If desired, a logo, trademark or operative information may be molded directly into the protector as at, for example, bottom wall 14. This feature, however, is merely explanative of an additional sophistication which may be included for purposes of convenience and does not, in and of itself, enter into the operational characteristics thereof.

The invention has been described with reference to the preferred embodiment. Obviously, modifications and alterations will occur to others upon the reading and understanding of the specification. It is my intention to include all such modifications and alterations insofar as they come within the scope of the appended claims or the equivalents thereof.

Having thus described my invention, I now claim:

1. A thread member and thread protecting device received over at least the threaded portion of said member in a close spaced thread protecting relationship therewith comprising in combination:

said member having standard, tapered pipe threads disposed axially along at least a portion thereof from one end which has a minimum outside thread diameter toward an area spaced inwardly from said one end having a maximum outside diameter; and, said thread protecting device having a generally cup-shaped body portion including a thin resilient continuous side wall with inner and outer surfaces, a closed bottom end and an open upper end, said cup-shaped body portion increasing in cross-sectional dimension over at least a portion of the axial length thereof from said closed bottom end toward said open upper end; at least said inner surface of said body portion side wall having a generally frusto-polygonal cross-sectioned portion adjacent said closed bottom end and a generally cylindrical portion adjacent said open upper end with said frusto-polygonal and cylindrical portions merging together at a merger zone spaced axially along said body portion inner surface from said closed bottom end toward said open upper end; said frusto-polygonal portion of said inner surface being comprised of alternating sides and transition zones with each of said sides including a pair of corner edges extending generally axially of said side wall inner surface, said frusto-polygonal portion having a minimum inside diameter slightly less than said minimum outside thread diameter and tapering outward from said closed bottom end at an angle greater than the taper angle of said threads with said cylindrical portion having an inside diameter greater than said maximum outside thread diameter, said frusto-polygonal portion sides closely engaging only a portion of at least some of said pipe threads adjacent said threaded member one end.

2. The combination as defined in claim 1 wherein only said sides of said polygonal portion which comprise a portion of said side wall inner surface diverge outwardly from said closed bottom end.

3. The combination as defined in claim 2 wherein said sides are generally planar adjacent said closed bottom end and gradually merge to a final, generally arcuate configuration adjacent said merger zone.

4. The combination as defined in claim 3 wherein each of said sides which comprise a portion of said side wall inner surface diverges outwardly at an angle of approximately 5° relative to a plane disposed normal to the plane of said bottom end.

5. The combination as defined in claim 4 wherein said merger zone is disposed along said side wall inner surface approximately ⅔ of the axial length of said body portion from said closed bottom end toward said open upper end.

6. The combination as defined in claim 3 wherein said closed bottom end is substantially hexagonal and said side wall inner surface is substantially hexagonal at said bottom end, each corner of said bottom end including a pair of said corner edges diverging outwardly of each other axially along said side wall inner surface from said closed bottom end toward said open upper end, the adjacent corner edges for adjacent sides of said frusto-polygonal portion defining said transition zones between them.

7. The combination as defined in claim 1 wherein the inner surface of said body portion side wall further includes thread engaging means adjacent said open upper end.

8. The combination as defined in claim 7 wherein said thread engaging means comprises at least one inwardly extending circumferential bead.

9. The combination as defined in claim 1 wherein said body portion side wall has a substantially uniform thickness.

10. A method for protecting standard tapered pipe threads included at one end of a member with said threads having a maximum thread diameter axially spaced from said one end and a minimum thread diameter adjacent said one end, said method comprising the steps of:

forming a thread protecting device having a generally cup-shaped body portion including a continuous side wall with inner and outer surfaces, a closed bottom end and an open upper end with at least said body portion increasing in cross-sectional dimension over at least a portion of the axial length thereof from said closed bottom end toward said open upper end, at least a portion of said inner surface of side body portion side wall having a generally frusto-polygonal cross-sectioned portion adjacent said closed bottom end comprised of alternating sides and transition zones;

sizing said frusto-polygonal portion to have a minimum inside diameter slightly less than said minimum outside diameter of the pipe threads and to taper outward from said closed bottom end at a greater angle than the taper of said threads;

sizing said body portion adjacent said open upper end to have an inside diameter greater than said maximum diameter of the pipe threads; and, placing said thread protecting device axially over the pipe threads from said one end with said frusto-polygonal portion sides engaging only a portion of at least some of said threads adjacent said member one end.

11. The method as defined in claim 10 wherein said step of forming comprises the steps of configuring said inner surface of said body portion such that said frusto-polygonal cross-sectioned portion merges into a generally cylindrical portion at a merger zone adjacent said open upper end and dimensioning said cylindrical portion to have an inside diameter greater than said maximum diameter of the pipe threads.

12. The method as defined in claim 10 further including the step of locking said protecting device on said threads by means of thread engaging means disposed adjacent said open upper end of said body portion.

* * * * *